United States Patent
Zurek et al.

(10) Patent No.: US 7,356,524 B2
(45) Date of Patent: Apr. 8, 2008

(54) QUERY RUNTIME ESTIMATION USING STATISTICAL QUERY RECORDS

(75) Inventors: Thomas Zurek, Walldorf (DE); Klaus Nagel, Heidelberg (DE); Stefan Dipper, Wiesloch (DE)

(73) Assignee: SAP AG, Walldorf (DE)

( * ) Notice: Subject to any disclaimer, the term of this patent is extended or adjusted under 35 U.S.C. 154(b) by 288 days.

(21) Appl. No.: 11/129,139

(22) Filed: May 13, 2005

(65) Prior Publication Data

US 2006/0259460 A1 Nov. 16, 2006

(51) Int. Cl.
*G06F 17/30* (2006.01)

(52) U.S. Cl. ............. 707/2; 707/3; 707/4; 707/5; 707/104.1

(58) Field of Classification Search ......... 706/2; 707/2, 3, 4, 5, 6, 7, 8, 10, 100, 102, 103 R, 707/104.1; 709/224
See application file for complete search history.

(56) References Cited

U.S. PATENT DOCUMENTS

| | | | | |
|---|---|---|---|---|
| 4,956,774 | A * | 9/1990 | Shibamiya et al. | 707/2 |
| 5,091,852 | A * | 2/1992 | Tsuchida et al. | 707/2 |
| 5,404,507 | A * | 4/1995 | Bohm et al. | 707/4 |
| 5,469,568 | A * | 11/1995 | Schiefer et al. | 707/2 |
| 5,734,884 | A * | 3/1998 | Eberhard et al. | 707/2 |
| 6,026,391 | A * | 2/2000 | Osborn et al. | 707/2 |
| 6,269,359 | B1 * | 7/2001 | Sekine | 707/2 |
| 6,353,818 | B1 * | 3/2002 | Carino, Jr. | 707/2 |
| 6,947,927 | B2 * | 9/2005 | Chaudhuri et al. | 707/3 |
| 6,968,330 | B2 * | 11/2005 | Edwards et al. | 707/2 |
| 7,120,648 | B2 * | 10/2006 | Garth et al. | 707/104.1 |
| 2004/0002961 | A1 | 1/2004 | Dettinger | |
| 2004/0083204 | A1 | 4/2004 | Dettinger | |
| 2004/0098372 | A1 * | 5/2004 | Bayliss et al. | 707/3 |
| 2004/0117359 | A1 | 6/2004 | Snodgrass | |
| 2004/0236735 | A1 | 11/2004 | Chaudhuri | |
| 2005/0004907 | A1 | 1/2005 | Bruno | |
| 2005/0039033 | A1 | 2/2005 | Meyers | |
| 2005/0065921 | A1 | 3/2005 | Hrle | |
| 2005/0091196 | A1 | 4/2005 | Day | |
| 2005/0228776 | A1 * | 10/2005 | Dettinger et al. | 707/2 |
| 2007/0043697 | A1 * | 2/2007 | Driesch et al. | 707/2 |
| 2007/0156668 | A1 * | 7/2007 | Dettinger et al. | 707/4 |

OTHER PUBLICATIONS

Surajit Chaudhuri, et al., "Estimating Progress of Execution for SQL Queries", Proceedings of the 2004 ACM Sigmod International Conference on Management of Data: pp. 803-814 (2004).

Gang Lu et al., "Toward a Progress for Database Queries", Proceedings of the 2004 ACM Sigmod International conference on Management of Data: pp. 791-802 (2004).

\* cited by examiner

*Primary Examiner*—Pierre Vital
*Assistant Examiner*—Christopher P Nofal
(74) *Attorney, Agent, or Firm*—Mintz, Levin, Cohn, Ferris, Glovsky and Popeo, P.C.

(57) ABSTRACT

A method for estimating a runtime of a query of a data repository may abstract, extract, or otherwise generate one or more parameters of the query. Thereafter, the abstracted parameters may be associated with one or more statistical query records. From these statistical query records, a query runtime may be estimated. Related apparatuses, computer program products, and computer systems are also described.

18 Claims, 3 Drawing Sheets

QUERY RUNTIME ESTIMATION USING STATISTICAL QUERY RECORDS

TECHNICAL FIELD

The subject matter described herein relates to estimating the resource consumption of a computer-based data query.

BACKGROUND

In the area of business intelligence (BI), analytical queries of data repositories such as data warehouses process large amounts of data. Therefore, depending on the nature of the query, associated runtimes for processing such queries may range from a few seconds to several hours. In order to facilitate informed decisions regarding queries, estimates of expected resource consumption (usually expressed as runtime) associated with the query may be provided prior to initiation In some database management systems, query optimizers may be utilized to calculate/estimate runtime using a cost model as well as statistical information pertaining to the queried data. For each proposed query, multiple execution plans, each having an associated cost estimation, are calculated. The query optimizer then chooses the cheapest execution plan according to the estimated costs.

Conventional query optimizers do not always provide precise runtime estimates as the underlying cost models are often oversimplified. Some optimizers utilize assumptions (e.g., uniform distribution of values, default statistics for certain tables) for which no statistical information has been gathered. Other optimizers focus solely on projected input/output (I/O) costs, thereby neglecting CPU or communication costs. For purposes of choosing an optimal or semi-optimal query execution plan, this latter arrangement may be acceptable as (a) non-I/O-related costs are likely to be roughly proportional to I/O costs and (b) costs are only considered in relation to each other (e.g., estimated costs for plan A are compared to estimated costs for plan B). However, in some cases, a more precise runtime estimate incorporating a wider range of cost factors (e.g. I/O, CPU, communication) and not only one dominating factor is required.

Most conventional query optimizers generate runtime estimates using historic statistical information. Such assumptions do not always provide an accurate estimate of runtime which can result in unexpected costs associated with processing a query.

SUMMARY

In one aspect, a method may abstract one or more parameters of a data repository query, associate the abstracted parameters with one or more statistical query records, and provide an estimate of query runtime (or other resource consumption indicator) based on the associated one or more statistical query records.

The abstracted parameters may include columns (e.g., grouping columns), tables (e.g., a multiset of tables), info-cubes (e.g., a multi-dimensional data structure), query filters, or the like. If the parameters are query filters, the method may also comprise determining a most selective condition within the query filter, and determining a selectivity of the most selective condition. In addition, the associating may comprise identifying a statistical query record that includes a filter condition matching the determined most selective condition and a filter selectivity that falls within a predetermined range of the determined selectivity.

In some variations, the method may include processing the query, calculating the runtime of the query, and generating a statistical query record for the query based on the calculated runtime. Such a generated statistical query record may be used to populate a library (which may later be searchable for subsequent query estimations).

The method may also provide that the estimating comprises providing one or more statistics based on the associated one or more statistical query records. A wide variety of statistical measures may be used including average runtime, median runtime, minimum runtime, maximum runtime, and the like. Other techniques for ensuring accurate estimates may be employed such as discarding statistical query records having at least one of the longest and shortest runtimes so that the query runtime estimation is based on the remaining associated one or more statistical query records.

The method may, in some variations, include estimating a number of query result records associated with the query based on the associated one or more statistical query records. Such query result records may be based on a number facts relevant to the query or they may be based on an expected result of the query.

In another aspect, an apparatus may comprise an abstraction unit to abstract one or more parameters of a data repository query, an association unit to associate the abstracted parameters with one or more statistical query records, and an estimator to provide an estimate of query runtime based on the associated one or more statistical query records.

The data repository may form part of the apparatus, the apparatus may receive results from an external module (which in turn is coupled to the data repository) to process the query, and/or the apparatus may be coupled to an external data repository. In some variations, the apparatus may also include a processor to process the query, a calculation unit to calculate the runtime of the query, and a record generator to generate a statistical query record for the query based on the calculated runtime. A display unit may also be coupled to the apparatus to convey generated runtime estimates to a user. Moreover, in some variations, the apparatus may include a database storing a plurality of statistical query records including the statistical query record generated by the record generator.

In another aspect, a method for estimating a number of query result records associated with a query of a data repository may comprise abstracting one or more parameters of the query, associating the abstracted parameters with one or more statistical query records, and estimating the number of query result records based on the associated one or more statistical query records.

In yet another aspect, a method for abstracting parameters from a data repository query comprises identifying one or more grouping columns, identifying one or more tables, and identifying one or more filters. In some variations, the filters may be modified and/or simplified to more generally categorize the filters.

Computer program products, which may be embodied on computer readable-material, are also described. Such computer program products may include executable instructions that cause a computer system to conduct one or more of the method acts described herein.

Similarly, computer systems are also described that may include a processor and a memory coupled to the processor. The memory may encode one or more programs that cause the processor to perform one or more of the method acts described herein.

The subject matter described herein provides many advantages including providing more accurate estimates of resource consumption and runtimes associated with queries.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
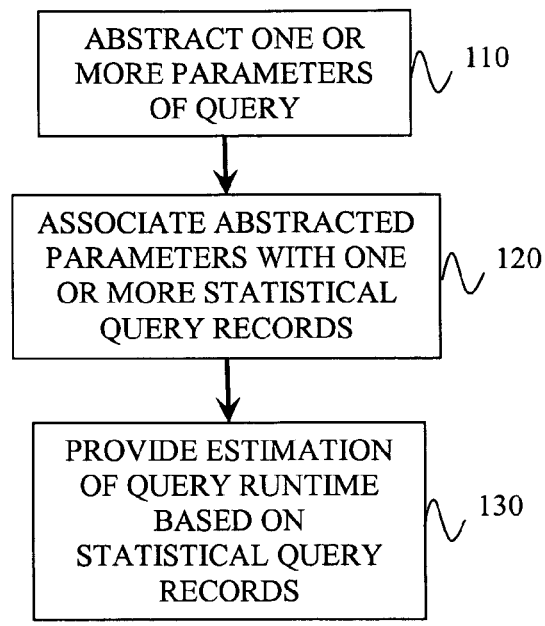
FIG. 1 is a process flow diagram illustrating a method for estimating a runtime of a query of a data repository.

FIG. 1 illustrates a computer-implemented method 100, that at step 110, abstracts one or more parameters of a data repository query. These abstracted parameters, at step 120, are associated with one or more statistical query records. Based on these associated one or more statistical query records, at step 130, an estimate of query runtime (or other resource consumption indicator) may be provided (e.g., a message, signal, display, etc.).

Figure 2:
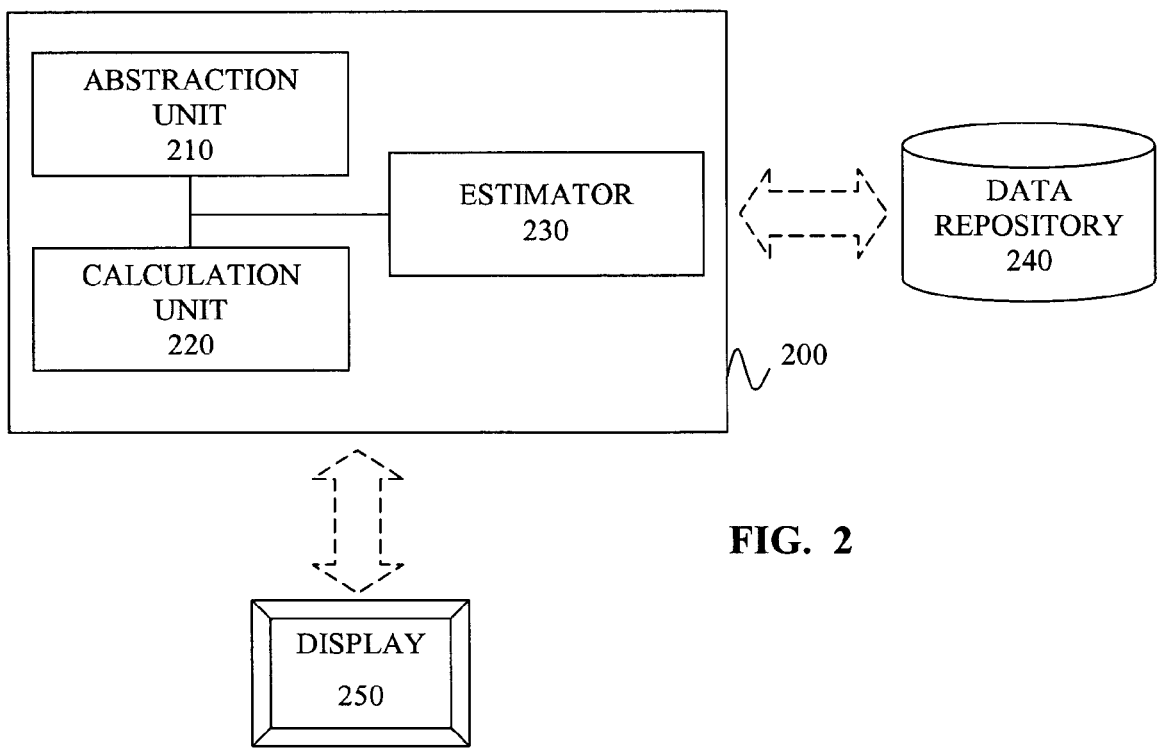
FIG. 2 is a schematic of an apparatus to estimate a runtime of a query of a data repository.

FIG. 2 illustrates an apparatus 200 comprising an abstraction unit 210, an association unit 220, and an estimator 230. The abstraction unit 210 abstracts one or more parameters of a data repository query. The association unit 220 associates the abstracted parameters with one or more statistical query records. The estimator 230 provides an estimate of query runtime based on the associated one or more statistical query records. In some variations, the apparatus may be coupled to or alternatively include a data repository 240 from which query results are generated. In addition or in the alternative, the apparatus may include or be coupled to a display 250 that includes a graphical user interface to convey the estimate to a user.

The following provides useful information for understanding and implementing the subject matter described herein as well as optional variations of the above method and/or apparatus that may be implemented singly or in combination depending on the desired configuration.

Historical runtime statistics from conventional database or database-related systems that gather runtime statistics (i.e., information on actual query runtimes) may be utilized to estimate future runtimes. However, as it is rare that two queries have been run in the same manner, literal query representations typically cannot be used (e.g. an SQL query statement represented as a character string) to find matching historical runtimes. As a result, essential query characteristics may be extracted in order to categorize queries and determine historic runtimes for that same category.

Table 1 below shows part of a sample statistical query record of a single query (which may be a single query step forming a business intelligence system query). Table 1 includes the following fields:

STATUID: a unique identifier to denote the query.

INFOCUBE: reporting object (e.g., self-contained dataset) on which the query is run. For example, a set of relational tables that are organized in a star schema, and/or transaction data managed outside of a data warehouse.

QDBSEL: number of records relevant for the query (i.e., the number of facts that are identified via the filter conditions of the query).

QDBTRANS: number of records relevant for the query (i.e., the number of facts that are identified via the filter conditions of the query).

QTIMEDB: the runtime of the query.

STARTTIME: the timestamp for the moment when the query was issued.

TABLE 1

| STATUID | INFOCUBE | QDBSEL | QDBTRANS | QTIMEDB | STARTTIME |
|---|---|---|---|---|---|
| 3UYM5HM6 . . . | BW_TX_01 | 2364 rows | 19 records | 0.101563 sec | 2004-09-01 08:30:44 |

The statistical query record for the query "3UYM5HM6 . . . " in Table 1 may be used to determine the runtime of a query X so long as query X has the same query abstraction as query "3UYM5HM6 . . . ". In some variations, in addition or in the alternative to runtime (QTIMEDB in the example), statistical query records may also provide predictions or estimates based values (e.g., query result records) such as number of rows (e.g., QDBSEL) or number of records (e.g., QDBTRANS).

Table 2 below illustrates a sample query pattern/template that utilizes SQL-like syntax, although it will be appreciated that the subject matter described herein may be useful in connection with any query format.

TABLE 2

SELECT <list of grouping columns>, <list of aggregation columns>
FROM <list of tables>
WHERE <join conditions> AND <filter1> AND <filter2>
AND . . . AND <filter n>
GROUP BY <list of grouping columns>

Extraneous clauses, such as a HAVING clause, within a query (e.g., a SQL query), or other clauses that might not be suitable for categorization purposes may be disregarded. Table 3 below illustrates a sample query:

TABLE 3

SELECT D1.quarter, d1.year, D2.country, SUM (F.profit),
AVG(F.revenue), COUNT(*)
FROM F, D1, D2, D3
WHERE F.k1 = D1.key AND F.k2 = D2.key AND F.k3 = D3.key
AND D1.year BETWEEN 2002 AND 2004 AND D3.product_group
IN ('SOFTWARE', 'HARDWARE')
GROUP BY D1.quarter, D1.year, D2.country Consequently, with the query of Table 3:

<list of grouping columns> = D1.quarter, D1.year, D2.country
<list of tables> = F, D1, D2, D3
<filter1> = D1.year BETWEEN 2002 AND 2004
<filter2> D3.product_group IN ('SOFTWARE', 'HARDWARE')

Some or all of these parameters may be used to formulate a query abstraction QA which comprises:
- a set of grouping columns (GC) found in <list of grouping columns> (in some variations, the order of the columns in <list of grouping columns> as well as the replicated columns may be ignored).
- a multiset of tables T in <list of tables> or an alternative representation such as an infocube (in some variations, the order of the tables is ignored with replicated tables remaining).
- a complete, simplified or reduced list of filters F1=<filter1>, F2=<filter2> (in some variations, a small number of fairly selective filters may be utilized such that non-selective or complex filters are discarded (e.g., the following filter (year=2004 OR colour='BLUE' AND product_group='CAR') might be simplified to (year=2004))).

In addition, each filter may be represented by a column co/(F) and the selectivity of the filter condition on that column se/(F):
- co/(F): in some variations, only simple filters (=filters comprising a single column) or simplified filters are considered for query abstraction. In the latter case, a dominating condition (i.e., the most selective condition) on a single column in a filter may be utilized.
- se/(F): selectivity may be represented in various ways: as the number of values in that condition (e.g., sel ("D1.year BETWEEN 2002 AND 2004')=3) or that number in relation to all values in the system (e.g., the system holds data over 10 years (i.e., sel ("D1.year BETWEEN 2002 AND 2004')0=3/10)) or that number in relation to all values in the particular scenario (e.g. table D1 holds 5 values in its column year (i.e., sel ("D1,year BETWEEN 2002 AND 2004")=3/5)).

Figure 3:
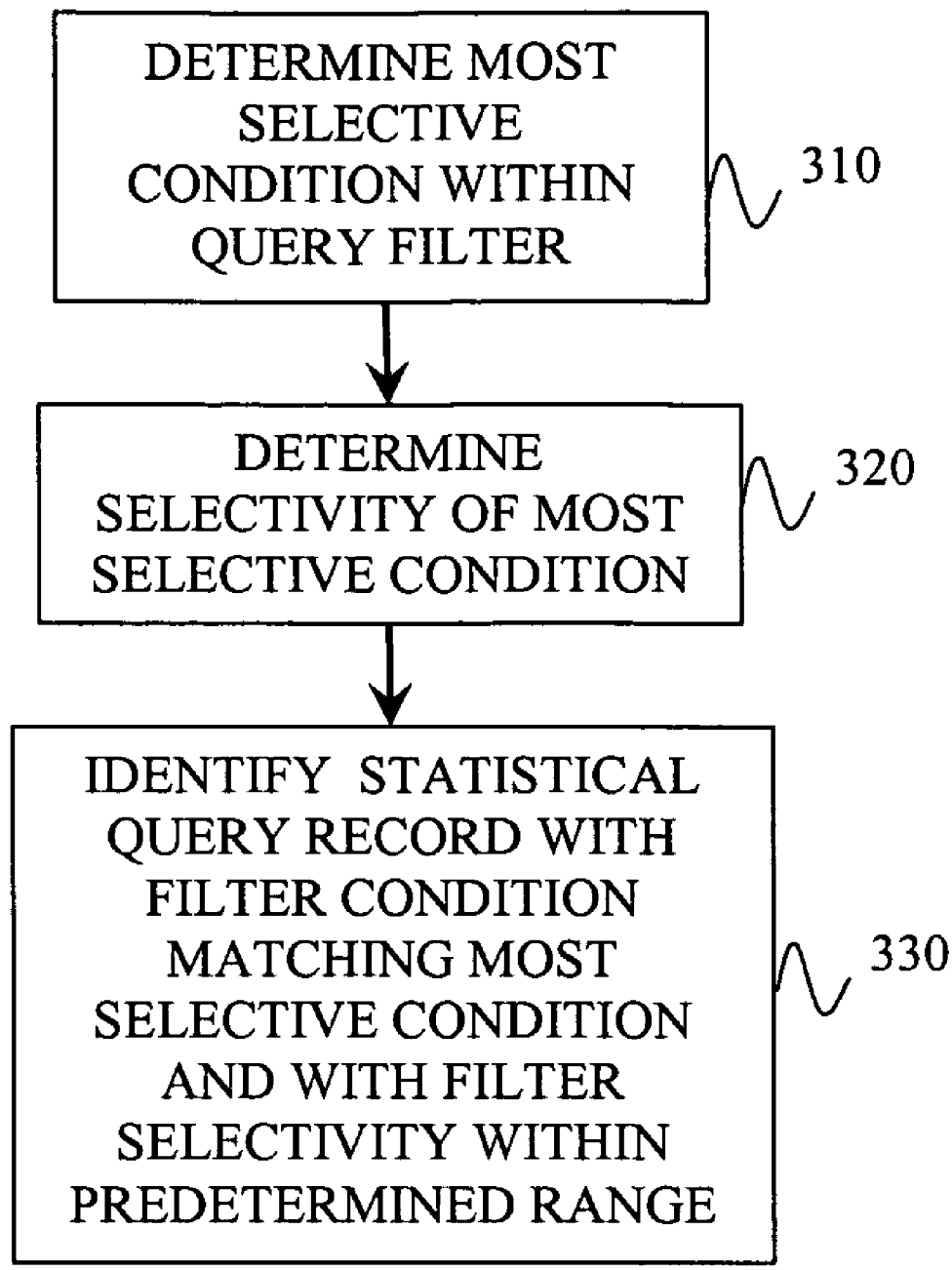
FIG. 3 is a first process flow diagram useful for understanding and implementing the subject matter described herein.

FIG. 3 illustrates a sample method 300 for selecting appropriate statistical records for use in generating an estimated runtime of a query containing at least one query filter. At step 310, a most selective condition within the within the query filter is identified or otherwise determined. Thereafter, at step 320, a selectivity of the most selective condition is determined. Statistical query records with filter conditions matching the most selective condition and also having a filter selectivity within a predetermined range are identified at step 330. Alternatively, either of the most selective condition or the filter selectivity may be used to initially In some variations, a query abstraction QA of a query X may comprise:
- the set GC of grouping columns in X
- the multiset T of tables or a representative multiset such as an infocube T
- a set of $m \geq 0$ pairs: [col(Fl), sel(Fl)], . . . , [col(Fm), sel(Fm)]

Table 4 shows a sample query abstraction of the query of Table 3.

TABLE 4

GC = {D1.quarter, d1.year, d2.country}
T = {F, D1, D3}
[D1.year,3], [D3.product_group,2]

Once the query abstraction has been defined, it may be determined whether the query abstraction matches any abstracts of previously processed queries. Statistical records for the previously processed queries (each having an associated query abstraction) may be identified by searching a library or other data repository. For example, one may define that query abstractions QA(X) and (WY) of queries X and Y are equivalent if all of the following conditions hold:
1. GC of QA(X)=GC of QA(Y)
2. T of QA(X)=T of QA(Y)
3. For every pair [col(F), sel(F)] in QA(X) there is a pair [col(F'), sel(F')] in QA(Y) such that:
   col(F)=col(F')
   $sel(F) \leq \Delta sel(F') \leq sel(F)+\Delta$. In some variations, the $\Delta$ value is chosen such that there is a balance between selecting a query Y with an equivalent query abstraction ($\Delta$ to be set higher) and obtaining a good estimate by finding a query Y that is very close/similar to X ($\Delta$ to be set lower). The trade-off needs to be set according to the priorities of the specific system.

Table 5 shows a query that has a query abstraction that is equivalent to the one of the query shown in Table 3.

TABLE 5

SELECT D1.quarter, D1.year, D2.country, COUNT(*)
FROM F, D1, D2, D3
WHERE F.k1 = D1. key AND F.k2 = D2.key AND F.k3 = D3.key
AND D1.year IN (1998,2001,2003) AND D3.product_group
IN ('SOFTWARE', 'HARDWARE')
GROUP BY D1.quarter, D1.year, D2.country Once the query abstraction QA(X) for a certain query X is obtained, and statistical query records and/or runtimes are obtained for queries with query abstractions similar to that of QA(X) (e.g., by searching a library of previously processed queries), a runtime may be estimated for query X. The runtime for query X may be determined in a variety of ways including aggregating the runtimes from matching query abstractions or by using other statistical measures. For example, one or more of the following statistical measures may be provided (whether singly or in combination): average, minimum and/or maximum of the N most recent runtimes may be calculated, average, minimum and/or maximum of all runtimes may be calculated, one of the preceding two approaches after discarding best and the worst runtimes, and the like.

In some variations, the statistical measures may be filtered prior to being provided a user or other component. For example, if there is only a small deviation in average historic runtimes, then only the average or median runtime may be calculated. On the other hand, if there are large deviations, then additional statistical measures such as minimum and maximum may be calculated.

In addition, in some variations, the actual runtime for query X may be monitored and subsequently compared against one or more of the provided statistical measures (e.g., average runtime). If the actual runtime does not significantly deviate with the statistical measures, then the statistical query record for query X may be added to the library. However, if the actual runtime deviates from the statistical measures, then either the statistical query record for query X may be not be added to the library and/or the one or more statistical query records within the library (e.g., one or more of those statistical query records used to generate the statistical measures) may be discarded so that they are no longer used in subsequent estimates. This periodic deletion of statistical query records may be of particular use as more recent runtimes are typically more precise as system performance changes over time.

Figure 4:
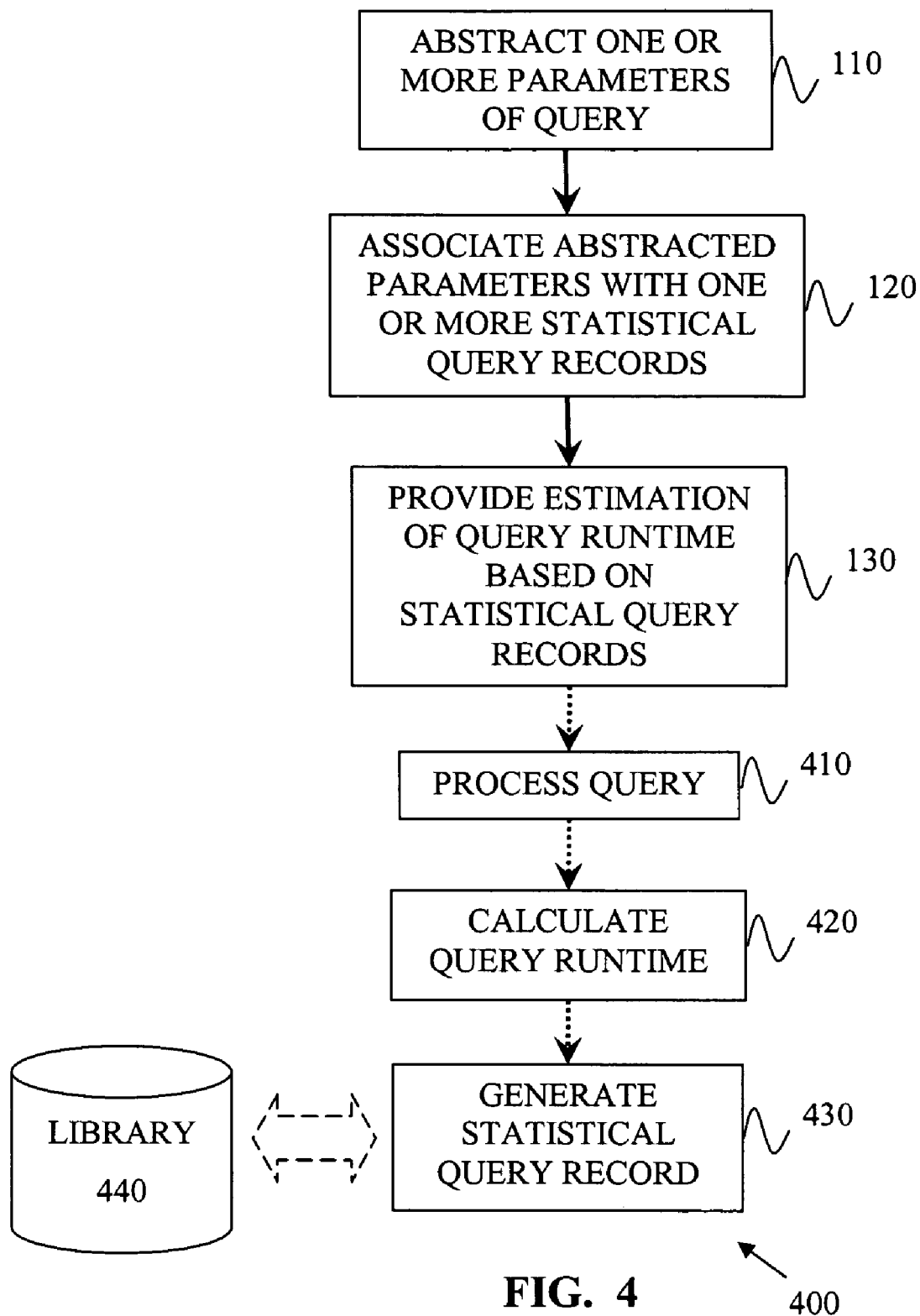
FIG. 4 is a second process flow diagram useful for understanding and implementing the subject matter described herein.

The process flow diagram 400 of FIG. 4, illustrates a variation in which the steps of FIG. 1 continue with further steps. After an estimate of query runtime based on statistical query records is provided at step 130, the query may be processed, at step 410, if the estimated runtime is acceptable. A user may determine whether the estimated runtime is acceptable or a computing device (local or a network node) may obtain the estimate and determine whether to process the query. For example, the computing device may automatically process all queries that have a runtime below a certain threshold. Queries having estimated runtimes greater than the threshold, may, for example, be delayed for load balancing purposes and/or be presented to a user for approval.

After the query is processed, at step 420, the actual runtime of the query may be calculated. Based on this runtime, at step 430, a statistical query record may be generated. Optionally, this statistical query record may, at step 440, be used to populate a library. Once stored in the library, the statistical query record may be searched or otherwise accessed in order to provide runtime estimates for subsequent, identical or similar, queries.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer-implemented method comprising:
abstracting one or more parameters of a data repository query by extracting at least a grouping column, a table, and a query filter to form a query abstraction, wherein the one or more parameters include the query filter, wherein abstracting determines a most selective condition within the query filter and determines a selectivity of the most selective condition;
associating the abstracted parameters with one or more statistical query records, wherein associating further comprises identifying a statistical query record that includes the query filter condition matching the determined most selective condition and the query filter selectivity that falls within a predetermined range of the determined selectivity; and
providing, to a user interface for presentation, an estimate of query runtime for the query abstraction, the estimate determined based on the associated one or more statistical query records.

2. A method as in claim 1, wherein the providing further comprises sending to a user interface a message including the estimate.

3. A method as in claim 1, further comprising displaying, at the user interface, the estimate to a user.

4. A method as in claim 1, wherein the one or more abstracted parameters comprise one or more of the following:
    set of grouping columns, a set of tables, infocubes, or query filters, the infocube comprising a multi-dimensional data structure.

5. A method as in claim 1, further comprising:
    processing the query;
    calculating the runtime of the query; and
    generating a statistical query record for the query based on the calculated runtime.

6. A method as in claim 5, further comprising populating a library with the generated statistical query records.

7. A method as in claim 1, wherein the estimating further comprises: providing one or more statistics based on the associated one or more statistical query records.

8. A method as in claim 7, wherein the one or more statistics are chosen from the group comprising: average runtime, median runtime, minimum runtime, or maximum runtime.

9. A method as in claim 1, wherein the estimating further comprises:
    discarding statistical query records having at least one of the longest and shortest runtimes;
    wherein the query runtime estimation is based on the remaining associated one or more statistical query records.

10. A method as in claim 1, further comprising: estimating a number of query result records associated with the query based on the associated one or more statistical query records.

11. A method as in claim 10, wherein the number of query result records is based on a number of facts relevant to the query.

12. A method as in claim 10, wherein the number of query result records is based on an expected result of the query.

13. A system comprising:
    a processor; and
    a memory, wherein the processor and memory are configured to provide an apparatus comprising:
    an abstraction unit to abstract one or more parameters of a data repository query by extracting at least a grouping column, a table, and a query filter to form a query abstraction, wherein the one or more parameters include the query filter, wherein abstracting determines a most selective condition within the query filter and determines a selectivity of the most selective condition;
    an association, to a user interface for presentation, unit to associate the abstracted parameters with one or more statistical query records, wherein associating further comprises identifying a statistical query record that includes the query filter condition matching the determined most selective condition and the query filter selectivity that falls within a predetermined range of the determined selectivity; and
    an estimator to provide an estimate of query runtime for the query abstraction, the estimate determined based on the associated one or more statistical query records.

14. An apparatus as in claim 13, further comprising accessing the data repository.

15. An apparatus as in claim 13, further comprising:
    a processor to process the query;
    a calculation unit to calculate the runtime of the query; and
    a record generator to generate a statistical query record for the query based on the calculated runtime.

16. An apparatus as in claim 15, further comprising a database storing a plurality of statistical query records including the statistical query record generated by the record generator.

17. An apparatus as in claim 13, wherein the one or more parameters include a query filter and further comprising:
    a determination unit to determine a most selective condition within the query filter and to determine a selectivity of the most selective condition; and
    an identification unit to identify a statistical query record that includes a filter condition matching the determined most selective condition and a filter selectivity that falls within a predetermined range of the determined selectivity.

18. A computer program product, embodied on computer readable-material, the computer program product including executable instructions for estimating a runtime of a query of a data repository that cause a computer system to provide a method comprising:
    abstracting one or more parameters of the query by extracting at least a grouping column, a table, and a query filter to form a query abstraction, wherein the one or more parameters include the query filter, wherein abstracting determines a most selective condition within the query filter and determines a selectivity of the most selective condition;
    associating the abstracted parameters with one or more statistical query records, wherein associating further comprises identifying a statistical query record that includes the query filter condition matching the determined most selective condition and the query filter selectivity that falls within a predetermined range of the determined selectivity; and
    estimating the query runtime for the query abstraction, the estimate determined based on the associated one or more statistical query records.

* * * * *